United States Patent
Stumpf, Jr. et al.

(10) Patent No.: US 7,383,940 B1
(45) Date of Patent: Jun. 10, 2008

(54) PRIMARY CONVEYOR BELT CLEANER BLADE HAVING A HARDENED EDGE MOLDED INTO A RESILIENT BODY

(76) Inventors: Adolph J Stumpf, Jr., 2427 Silverstrand Ave., Hermosa Beach, CA (US) 90254; Carl L. Suttle, P.O. Box 112, Stanaford, WV (US) 25927

( * ) Notice: Subject to any disclaimer, the term of this patent is extended or adjusted under 35 U.S.C. 154(b) by 0 days.

(21) Appl. No.: 11/621,856

(22) Filed: Jan. 10, 2007

(51) Int. Cl.
 *B65G 45/16* (2006.01)
(52) U.S. Cl. ........................... 198/499; 198/497
(58) Field of Classification Search .............. 198/497, 198/498, 499
See application file for complete search history.

(56) References Cited

U.S. PATENT DOCUMENTS

| | | |
|---|---|---|
| 3,703,019 A | 11/1972 | Bratt |
| 3,795,308 A | 3/1974 | Oury |
| 4,520,917 A * | 6/1985 | Sillivent et al. ............ 198/499 |
| 4,927,003 A | 5/1990 | Swinderman et al. |
| 5,413,208 A | 5/1995 | Veenhof |
| 5,647,476 A | 7/1997 | Veenhof |
| 5,722,528 A | 3/1998 | Dolan |
| 5,735,385 A * | 4/1998 | Bowler et al. .............. 198/499 |
| 5,797,477 A | 8/1998 | Veenhof |
| 5,975,281 A * | 11/1999 | Yoshizako et al. .......... 198/499 |
| 6,279,727 B1 | 8/2001 | Waalkes et al. |
| 6,321,901 B1 | 11/2001 | Strebel et al. |
| 6,575,292 B2 * | 6/2003 | Swinderman ............... 198/499 |
| 6,581,754 B2 * | 6/2003 | Law ........................... 198/499 |
| 6,619,469 B2 * | 9/2003 | Malmberg ................... 198/497 |
| 6,695,123 B2 * | 2/2004 | Stoll .......................... 198/499 |
| 6,823,983 B2 * | 11/2004 | DeVries ...................... 198/499 |
| 6,929,112 B2 * | 8/2005 | Hall ........................... 198/499 |
| 6,968,940 B2 * | 11/2005 | Wiggins ..................... 198/497 |
| 6,978,881 B2 * | 12/2005 | Brink ......................... 198/499 |
| 7,093,706 B2 * | 8/2006 | DeVries et al. ............. 198/499 |
| 7,131,525 B2 * | 11/2006 | Swinderman et al. ....... 198/497 |

* cited by examiner

*Primary Examiner*—James R Bidwell

(57) ABSTRACT

A primary conveyor belt scraper blade has a hardened edge molded within a resilient blade body. The hardened edge has a Mohs hardness of at least 8.9. The hardened edge is retained within the blade body by chemical bonds, so that the hardened edge and the blade body form a solid, one-piece unit.

18 Claims, 4 Drawing Sheets

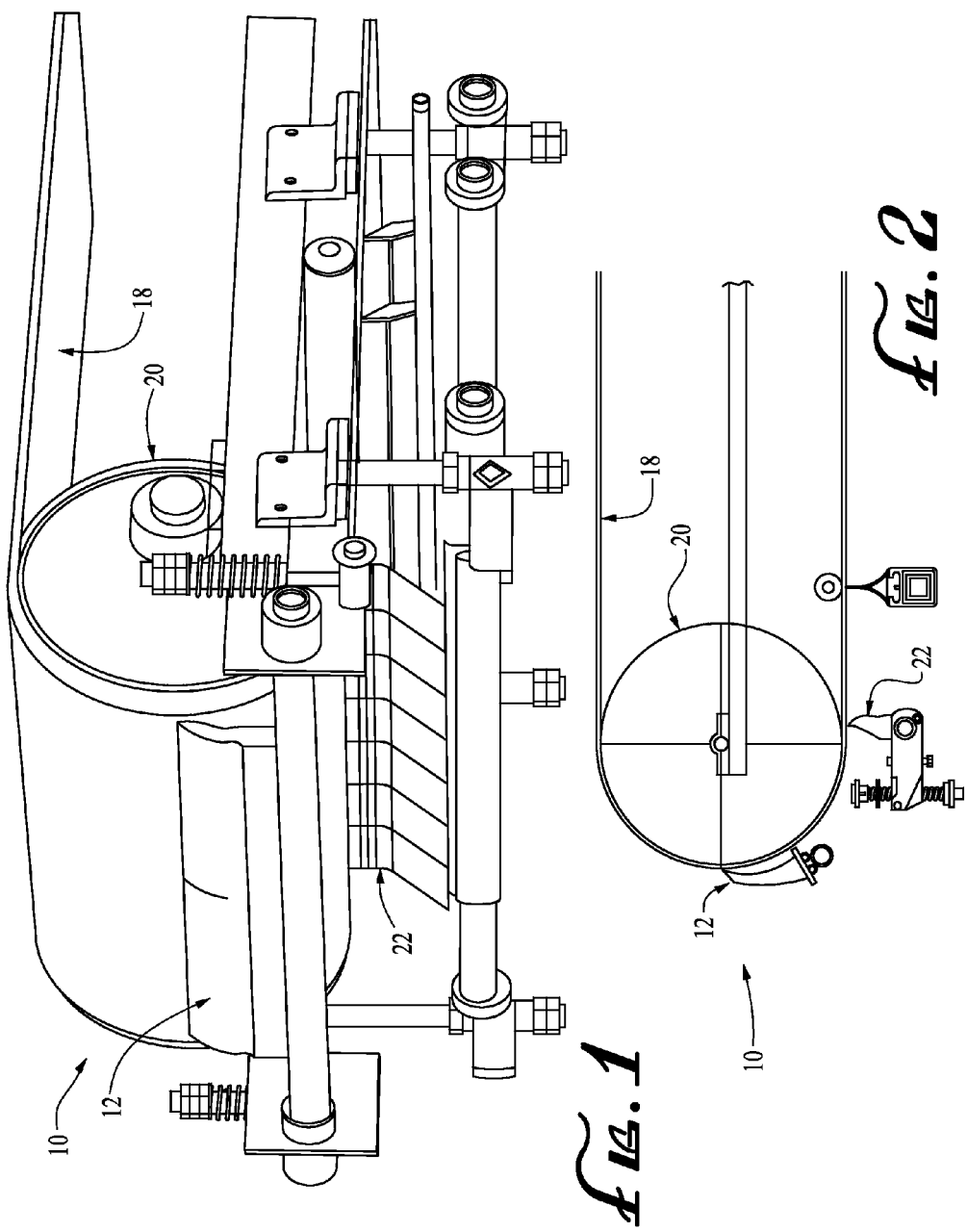

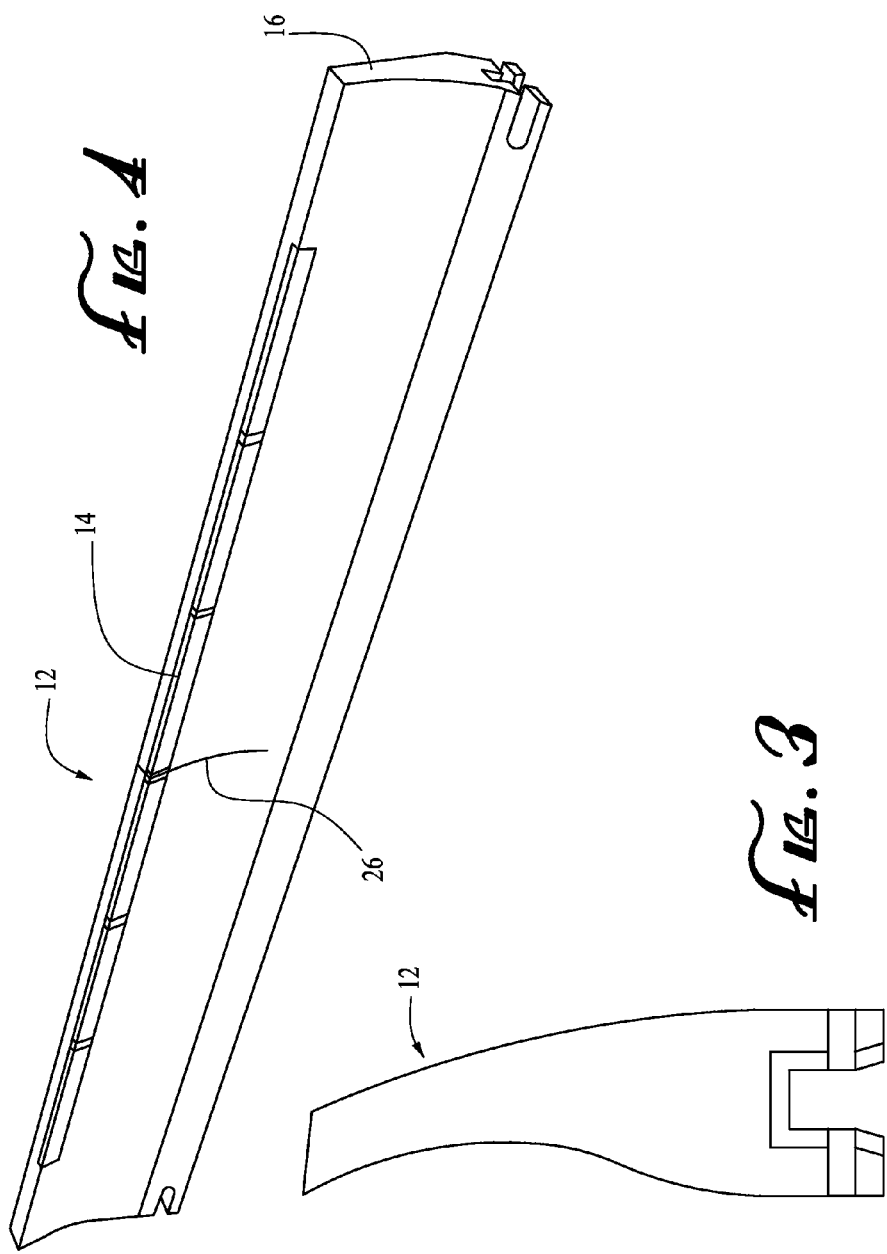

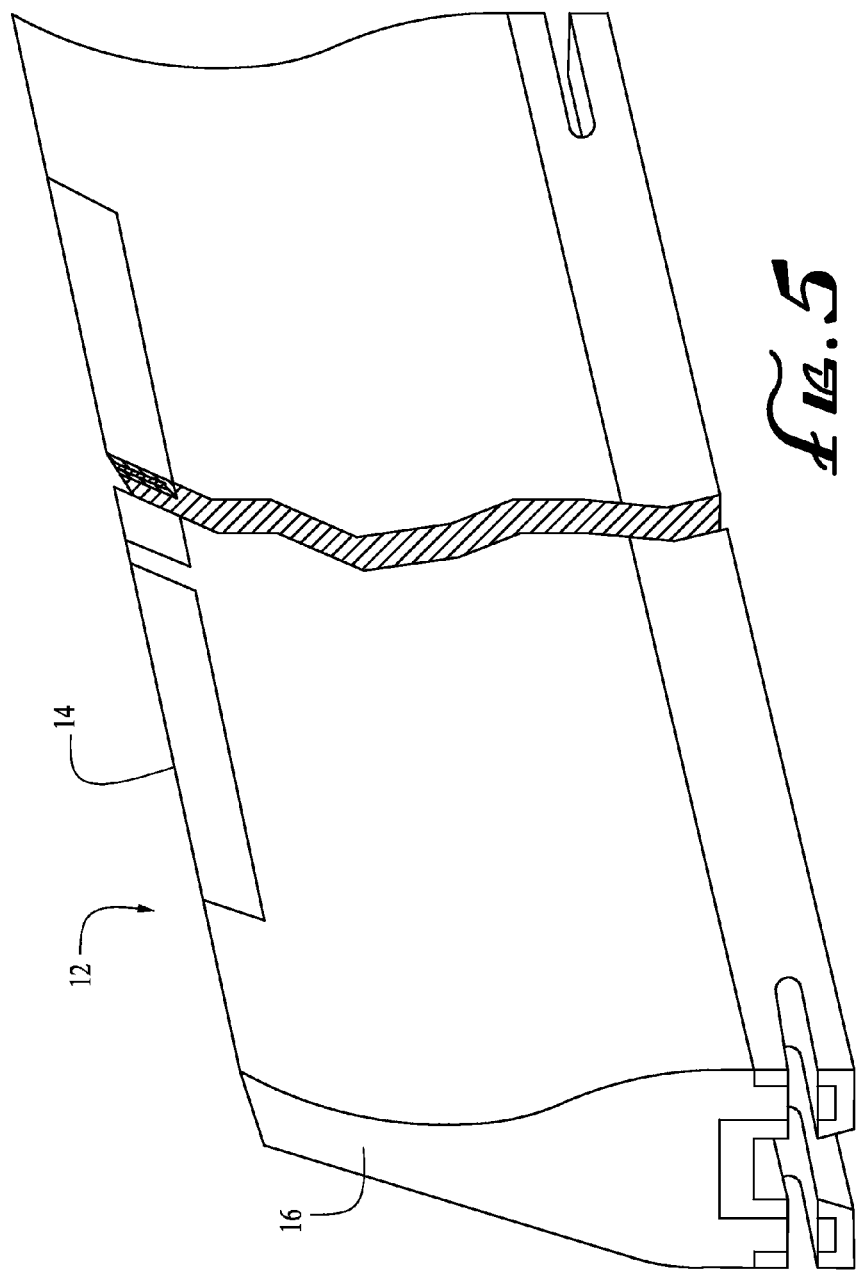

PRIMARY CONVEYOR BELT CLEANER BLADE HAVING A HARDENED EDGE MOLDED INTO A RESILIENT BODY

FIELD OF THE INVENTION

This invention related generally to conveyor belt cleaner blades and, more specifically, to primary conveyor belt cleaner blades.

BACKGROUND

Primary conveyor belt cleaner blades are used as an initial scraping tool to remove foreign substances from moving conveyor belts. Unlike secondary conveyor belt scraper blades which are disposed "downstream" of the primary conveyor belt scraper blade, the primary conveyor belt scraper blade is disposed at a very aggressive angle with respect to the conveyor belt so as to remove a maximum amount of foreign material from the conveyor belt.

Typically, prior art primary conveyor belt scraper blades are made from materials which are relatively soft, so as not to damage the expensive conveyor belt. However, such relatively soft primary conveyor belt scraper blades are inefficient in that they do not clean the conveyor belt as well as would be desired.

Efforts to make primary conveyor belt scraper blades with harder materials have been unsuccessful because such harder primary conveyor belt scraper blades have been found to be unduly destructive to the conveyor belt material. Because a moving conveyor belt is not a completely smooth surface, a hardened primary conveyor belt scraper blade tends to scrape away any thickened or outpouched portion of the conveyor belt.

Accordingly, there is a need for a primary conveyor belt scraper blade which avoids the aforementioned problems in the prior art.

SUMMARY

The invention satisfies this need. The invention is a primary conveyor belt scraper having a hardened edge molded within a resilient blade body. The hardened edge has a Mohs hardness of at least 8.9. The hardened edge is retained within the blade body by chemical bonds, so that the hardened edge and the blade body form a solid, one-piece unit.

DRAWINGS

FIG. 1 is a perspective view of one end of a conveyor belt system having features of the invention;

FIG. 2 is a simplified side view of the conveyor belt system illustrated in FIG. 1;

FIG. 3 is an end view of a primary conveyor belt scraper blade having features of the invention;

FIG. 4 is a perspective view of the primary conveyor belt scraper blade illustrated in FIG. 3;

FIG. 5 is an enlarged detail view of the primary conveyor belt scraper blade illustrated in FIG. 4.

DETAILED DESCRIPTION

Figure 6:
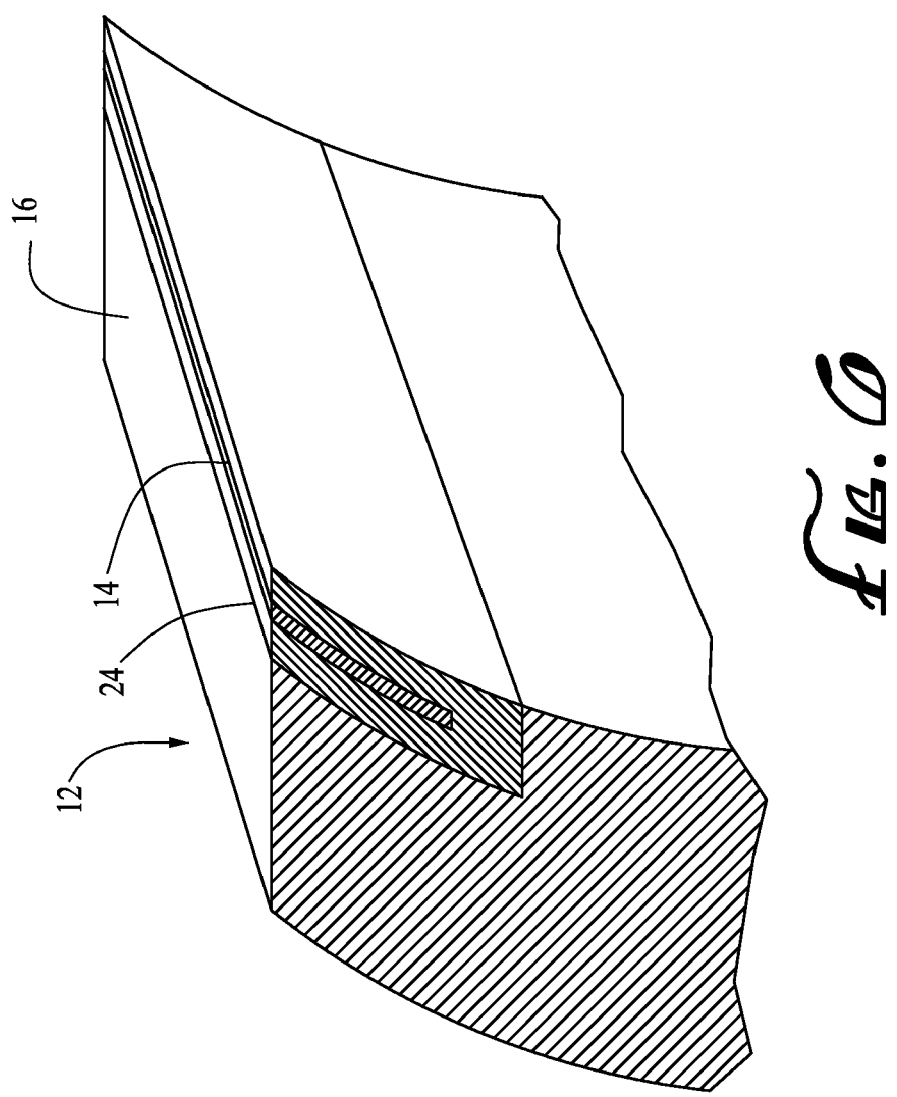
FIG. 6 is an enlarged detail perspective view of the primary conveyor belt scraper blade illustrated in FIG. 5.

The following discussion describes in detail one embodiment of the invention and several variations of that embodiment. This discussion should not be construed, however, as limiting the invention to those particular embodiments. Practitioners skilled in the art will recognize numerous other embodiments as well.

The invention is a conveyor belt system 10 having a primary conveyor belt scraper blade 12 with a hardened edge 14 molded within a resilient blade body 16. A typical embodiment of such a conveyor belt system 10 is illustrated in FIGS. 1 and 2. The conveyor belt system 10 further comprises a continuous conveyor belt 18 disposed around at least one head pulley 20. The primary conveyor scraper belt is disposed in contact with the conveyor belt 18 proximate to the head pulley 20. The primary conveyor belt scraper blade 12 acts to remove most of the debris clinging to the conveyor belt 18. A secondary conveyor belt scraper blade 22 is disposed "downstream" of the primary conveyor belt scraper blade 12. The conveyor belt scraper blade 22 acts to scrape away debris remaining on the conveyor belt 18 after the conveyor belt 18 has moved past the primary conveyor belt scraper blade 12.

Typically, the primary conveyor belt scraper blade 12 is disposed in contact with the conveyor belt 18 at an aggressive angle with respect to the conveyor belt 18, such as about 90° with respect to the conveyor belt 18 or even at a positive "rake angle" with respect to the conveyor belt 18.

The primary conveyor belt scraper blade 12 of the invention is illustrated in detail in FIGS. 4-6. The hardened edge 14 of the primary conveyor belt scraper blade 12 is molded within the resilient blade body to form an integral unit.

The hardened edge 14 has a Mohs hardness of at least 8.9. Materials useable in the construction of the hardened edge 14 comprise ceramics and tungsten alloys, including tungsten carbide alloys. The hardened edge 14 can be continuous or can be segmented as illustrated in FIG. 4.

The resilient blade body 16 is made from a material having sufficient resiliency such that, when the primary conveyor belt scraper blade 12 is aggressively disposed against a moving conveyor belt 18, the primary conveyor belt scraper blade 12 will be deflected by a thickened or outpouched portion of the conveyor belt 18, rather than cutting into the conveyor belt 18. In one embodiment, the resilient blade body 16 is made from a polymer, such a polyurethane polymer. In other embodiments, the resilient blade body 16 can be made from other elastomers, such as plastics or ultra-high molecular weight polyethylene or it can be made from rubbers.

The hardened edge 14 is molded within the resilient blade body 16 and is retained within the resilient blade body 16 by chemical bonds, so that the hardened edge 14 and the resilient blade body 16 form a solid, one-piece integral unit.

In some applications, a liner 24 is sandwiched between the hardened edge 14 and the resilient blade body 16 to facilitate the bonding of the hardened edge 14 to the resilient blade body 16. The liner 24 is typically welded to the hardened edge 14 and is attached to the resilient blade body 16 by chemical bonds, such as by a suitable adhesive. In a typical embodiment wherein the hardened edge 14 is a tungsten alloy, the liner 24 can be a steel. The liner 24 can be a solid, continuous unit or it can comprise a plurality of segmented units.

As illustrated in FIG. 4, the resilient blade body 16 can be scored in one or more locations to increase the resiliency of the resilient blade body 16. Such scoring 26 can comprise cuts which are continuous through the web of the resilient blade body 16 or they can comprise partial cuts which do not go all the way through the web.

Primary conveyor belt scraper blades 12 of the invention can be made in a wide variety of sizes. The primary conveyor belt scraper blade 12 of the invention can be made in lengths as short as 6 inches or shorter and as long as 120 inches or more. The primary conveyor belt scraper blade 12 of the invention can be easily retrofitted to existing conveyor belt systems, and can be adapted to work with both flat or crowned conveyor systems.

The invention provides an effective and efficient primary conveyor belt scraper blade which minimizes damage to the conveyor belt. Because of the unique construction of the invention wherein a hardened edge is molded into a resilient blade body, the primary conveyor belt scraper blade can be deflected away from thickened or outpouched portions of a moving conveyor belt, rather than cutting into and damaging the conveyor belt.

Having thus described the invention, it should be apparent that numerous structural modifications and adaptations may be resorted to without departing from the scope and fair meaning of the instant invention as set forth hereinabove.

What is claimed is:

1. A primary conveyor belt scraper blade comprising a hardened edge molded within a resilient blade body, the hardened edge having a Mohs hardness of at least 8.9, the hardened edge being retained within the blade body by chemical bonds, so that the hardened edge and the blade body form a solid, one-piece unit.

2. The primary conveyor belt scraper blade of claim 1 wherein a liner is sandwiched between the hardened edge and the blade body, the liner being molded within the blade body so that the hardened edge, the liner and the blade body form a solid, one-piece unit.

3. The primary conveyor belt scraper blade of claim 2 wherein the liner is made from a steel.

4. The primary conveyor belt scraper blade of claim 1 wherein the hardened edge is made from a tungsten alloy.

5. The primary conveyor belt scraper blade of claim 1 wherein the hardened edge is made from a tungsten carbide alloy.

6. The primary conveyor belt scraper blade of claim 1 wherein the hardened edge is made from a ceramic.

7. The primary conveyor belt scraper blade of claim 1 wherein the blade body is made from a polymer.

8. The primary conveyor belt scraper blade of claim 1 wherein the blade body is made from polyurethane.

9. The primary conveyor belt scraper blade of claim 1 wherein the blade body is scored.

10. A conveyor belt system comprising:
    (a) a continuous conveyor belt disposed tightly around a portion of a conveyor belt head pulley; and
    (b) a primary conveyor belt scraper blade disposed in contact with the conveyor belt such that the primary conveyor belt scraper blade continuously scrapes off material from the conveyor belt, the primary conveyor belt scraper blade comprising a hardened edge molded within a resilient blade body, the hardened edge having a Mohs hardness of at least 8.9, the hardened edge being retained within the blade body by chemical bonds, so that the hardened edge and the blade body form a solid, one-piece unit.

11. The primary conveyor belt scraper blade of claim 10 wherein a liner is sandwiched between the hardened edge and the blade body, the liner being molded within the blade body so that the hardened edge, the liner and the blade body form a solid, one-piece unit.

12. The primary conveyor belt scraper blade of claim 11 wherein the liner is made from a steel.

13. The primary conveyor belt scraper blade of claim 10 wherein the hardened edge is made from a tungsten alloy.

14. The primary conveyor belt scraper blade of claim 10 wherein the hardened edge is made from a tungsten carbide alloy.

15. The primary conveyor belt scraper blade of claim 10 wherein the hardened edge is made from a ceramic.

16. The primary conveyor belt scraper blade of claim 10 wherein the blade body is made from a polymer.

17. The primary conveyor belt scraper blade of claim 10 wherein the blade body is made from polyurethane.

18. The primary conveyor belt scraper blade of claim 10 wherein the blade body is scored.

* * * * *

UNITED STATES PATENT AND TRADEMARK OFFICE
CERTIFICATE OF CORRECTION

PATENT NO.         : 7,383,940 B1                         Page 1 of 1
APPLICATION NO.    : 11/621856
DATED              : June 10, 2008
INVENTOR(S)        : Adolph J. Stumpf It is certified that error appears in the above-identified patent and that said Letters Patent is hereby corrected as shown below:

Col. 1 Summary: Line 4 should be 8-9. not 8.9.

Col. 2 Detailed Description: Line 5 should be scraper <u>Blade</u> not Belt.

Col. 2 Line 30 should be 8-9 not 8.9.

Col. 3 Claim 1: Line 3 should be 8-9 not 8.9.

Col. 4 Claim 10: Line 7 should be 8-9 not 8.9.

Signed and Sealed this

Second Day of June, 2009

JOHN DOLL
*Acting Director of the United States Patent and Trademark Office*

UNITED STATES PATENT AND TRADEMARK OFFICE
CERTIFICATE OF CORRECTION

PATENT NO.        : 7,383,940 B1
APPLICATION NO. : 11/621856
DATED              : June 10, 2008
INVENTOR(S)      : Adolph J. Stumpf It is certified that error appears in the above-identified patent and that said Letters Patent is hereby corrected as shown below:

Col. 1 Summary: Line 4 should be 8-9. not 8.9.

Col. 2 Detailed Description: Line 5 should be scraper <u>Blade</u> not Belt.

Col. 2 Line 30 should be 8-9 not 8.9.

Col. 3 Claim 1: Line 24 should be 8-9 not 8.9.

Col. 4 Claim 10: Line 16 should be 8-9 not 8.9.

This certificate supersedes the Certificate of Correction issued June 2, 2009.

Signed and Sealed this

Twenty-third Day of June, 2009

JOHN DOLL
*Acting Director of the United States Patent and Trademark Office*